Figure 1:
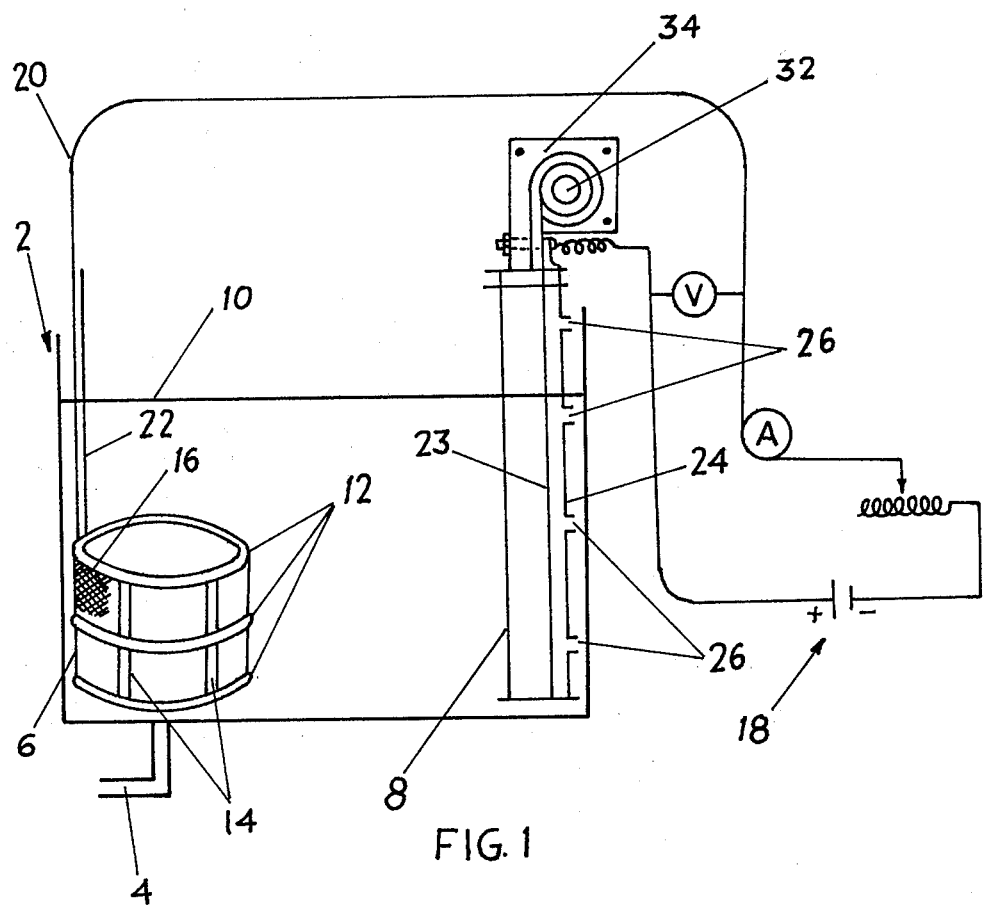

United States Patent

Supanekar et al.

[11] 3,953,307
[45] Apr. 27, 1976

[54] VAT DYE REDUCTION PROCESS FOR USE IN A DYEING PLANT FOR TEXTILE PROCESSING

[75] Inventors: Shashikant Dattatraya Supanekar; Erach Hormasji Daruwalla, both of Bombay, India

[73] Assignee: Bombay Textile Research Association, India

[22] Filed: July 31, 1974

[21] Appl. No.: 493,432

[30] Foreign Application Priority Data
Apr. 4, 1974 France .............................. 74.11634

[52] U.S. Cl. .............................................. 204/134
[51] Int. Cl.² ........................ B01K 1/00; C23B 1/22
[58] Field of Search ..................................... 204/134

[56] References Cited
UNITED STATES PATENTS
2,371,145 3/1945 Brubaker ............................ 204/134

Primary Examiner—R. L. Andrews
Attorney, Agent, or Firm—Sughrue, Rothwell, Mion & Zinn

[57] ABSTRACT

A process for compensating for reduction in the reducing effect caused by atmospheric oxygen or dissolved oxygen in an aqueous reducingsolution of sodium hydrosulphite employed in a vat dye reduction process wherein the vat dye is reduced and fixed on textile materials by the reducing action of the aqueous alkaline reducing solution, which process comprises generating hydrogen in said reducing solution, which hydrogen combines with the dissociation products of the sodium hydrosulphite to form a powerful reducing species with relatively high redox potential, by carrying out electrolysis of the aqueous alkaline solution.

6 Claims, 4 Drawing Figures

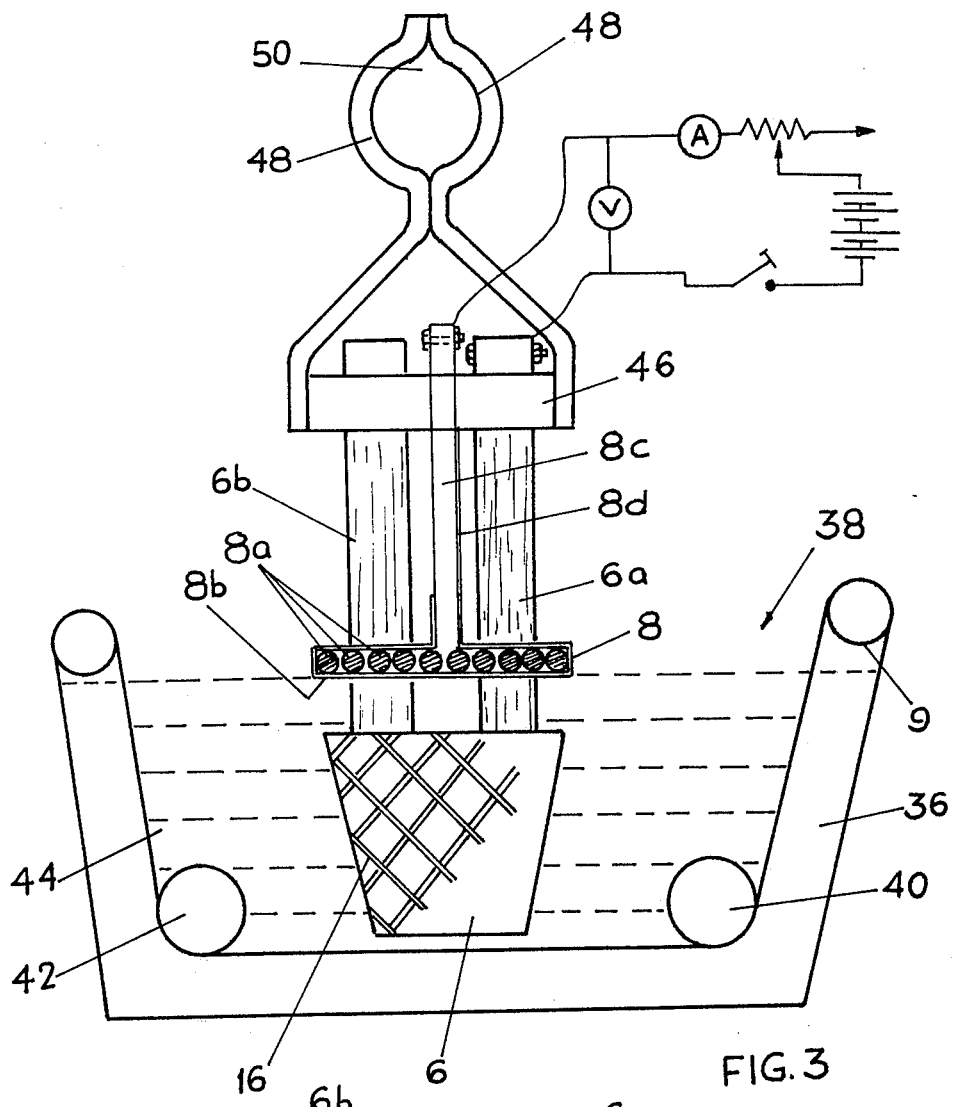
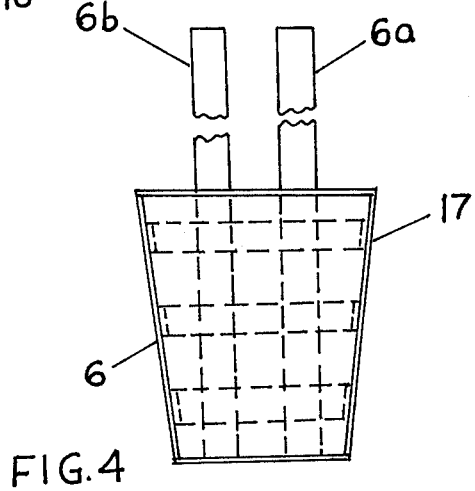
FIG. 3
FIG. 4

VAT DYE REDUCTION PROCESS FOR USE IN A DYEING PLANT FOR TEXTILE PROCESSING

This invention relates to a vat dye reduction process for use in a dyeing plant for textile processing and has as its object to provide a process which is economical and whereby the amount of chemical reducing agent or agents, particularly sodium hydrosulphite required for the reduction of vat dyes is minimized.

It has been found experimentally that considerable retardation occurs in the rate of decomposition of sodium hydrosulphite when an electric current is applied to the reducing solution of sodium hydrosulphite. This retardation or stabilizing effect is observed irrespective of the concentration of the hydrosulphite and temperature but its magnitude varies depending upon the conditions of the experiment; it is also observed in the presence of vat dyes in the alkaline reducing liquor.

An investigation has indicated that this stabilization effect occurs principally because of the formation of a powerful new reducing species, namely sulphoxylic acid and its sodium salt, during electrolysis. That this new species is a more powerful reducing agent than sodium hydrosulphite has been confirmed from measurements of redox potentials of the hydrosulphite solution before and after the passage of current. In fact, these measurements reveal that the sodium hydrosulphite solution after electrolysis shows a substantially high redox potential (−1218 mV) which is considerably higher than that of sodium hydrosulphite (−830 mV). It has also been found that the extent of generation of the reducing species varies directly with the period during which the electrolysis is carrried out.

The stabilizing effect of the electric current has been observed both in the absence and in the presence of vat dyes for all types of vat dyes, viz. dyes which are difficult to reduce such as C.I. Vat- Orange 9 (redox potential: −805 mV), dyes which are not so difficult to reduce such as C.I. Vat Brown 3 (redox potential: −740mV) and dyes which are easy to reduce such as C.I. Vat Black 27 (redox potential: −643 mV). This it should be understood occurs because of high reduction potential (−1218 mV) of the reducing species.

It has been observed that a continuous formation of the species is essential for maintaining the dyebath in the reduced state. There is, however, no difficulty encountered in maintaining the dye bath or the alkaline hydrosulphite solution in the reduced state during the period normally required for vatting, since the stability of the reducing species to air oxidation is found to be of similar order of magnitude as that of the sodium hydrosulphite.

This invention accordingly provides a process for compensating for reduction in the reducing effect caused by atmospheric oxygen or dissolved oxygen in an aqueous reducing solution of sodium hydrosulphite employed in the vat dye reduction process wherein vat dye is reduced and fixed on textile materials by the reducing action of the aqueous alkaline reducing solution, which process comprises generating hydrogen in said reducing solution in sufficient quantity, which hydrogen combines with the dissociation products of the sodium hydrosulphite to form a powerful reducing species with relatively high redox potential, by means of electrolysis carried out in said solution by employing a relatively small positive electrode submerged or on the surface of said solution, said negative and positive electrodes being operatively connected to a direct current source.

The aforesaid electrolysis may be effected continually or only for short intervals of time in order to maintain the strength of the reducing solution.

The positive and the negative electrodes required for effecting electrolysis are connectable to a d.c. power source and may be disposed in spaced-apart relationship in the reducing solution. Alternatively, the positive electrode may be disposed at the surface of the reducing solution and the negative electrode totally immersed in said solution. Preferably, adjustment means may be provided for raising or lowering the electrodes in relation to said reducing solution.

For maximum formation of sodium sulphoxylate, the negative electrode should be made of such materials as would allow high hydrogen over voltage, which would ensure that the negative electrode is covered by a large number of hydrogen atoms, and strong affinity for sulphur, which would encourage effective adsorption of sulphoxylate radical ions on the negative electrode surface so that said ions can then combine with the atomic hydrogen on the cathode surface to generate the desired reducing species. It has been found that of the metals Pb, Sn, Zn, Cu, Ag, Fe, Ni, W, Pd and Pt, the tendency for recombination of hydrogen radicals is minimum with Pb and maximum with Pt. Preferably, therefore, for maximum formation of sulphoxylic acid, the negative electrode should be made of Pb. Preferably also, the size of the negative electrode may be kept as large as convenient in order to allow the free hydrogen generated thereat to mix with a large volume of the reducing solution. In any event, it should be substantially larger than the positive electrode. Preferably, it may be in the form of a conducting wire mesh mounted on a cage and be connectable to said d-c power source by means of a conducting strip or wire. The aforesaid cage may be provided with support members and may run under said wire mesh so as to act as an additional support and as a conductor for connecting the wire mesh to the d-c power source. The cage may be made of any rigid insulating material that does not react with the solution such as, for instance, wood, ebonite or any synthetic material which is non-conducting.

The size of the positive electrode is preferably kept minimum in order to prevent free oxygen generated thereat from reducing the strength of the reducing solution. Preferably, the positive electrode, if immersed in the reducing solution, may comprise a conducting rod or strip housed in a casing having one or more windows; the windows in the casing may preferably be disposed on the side remote from the negative electrode. Alternatively, if disposed at the surface of the reducing solution, the positive electrode may comprise a wire mesh of conducting material mounted on horizontally disposed support members made of such rigid insulating material which does not react with the reducing solution, said support members being fixed to one end of upright support members, the other end whereof is fitted to a cross-plank suspended from a cradle-shaft or any similar arrangement; preferably, a stainless steel strip may be fixed to each upright support members, said stainless steel strip running under said wire mesh so as to provide an additional support and to act as a conducting medium for connecting the wire mesh to the d-c power supply. The casing of the positive electrode may be made of any rigid insulating material that does not react with the solution, such as wood, ebonite or any porous synthetic material which is non-conducting.

In the aforesaid process the positive electrode is found to corrode if maintained in the reducing solution during operation. The corrosion is found to start at the lower end of the electrode and progressively work its way up. To enable the lower end to be replaced after corrosion, the positive electrode may preferably be of a disposable or detachable type. For instance, it may comprise a conducting strip wound on a pulley disposed above the reducing solution so that the strip can be replaced by lowering further lengths thereof in the reducing solution by operating the pulley.

The positive electrode may be made of stainless steel and may be of straight, curved or corrugated shape.

Since, as aforesaid, considerable retardation occurs in the rate of decomposition of sodium hydrosulphite in the alkaline solution on the application of electric current, the quantity of sodium hydrosulphite required to be used during vatting is considerably less than that normally required. This economy in the use of the sodium hydrosulphite it has been found can be increased further upto 60% for instance, if sodium bisulphite or any other cheaper reducing agent, such as sodium sulphite, sodium sulphide or dextrin, is used together with sodium hydrosulphite and the electric current applied. This, it has been found, occurs due to the fact that sodium bisulphite exerts a synergistic effect on the reduction characteristics of the species formed and on the sodium hydrosulphite also.

The reducing solution may thus comprise an aqueous solution of caustic soda to which only sodium hydrosulphite has been added or a mixture of sodium hydrosulphite and a relatively cheaper reducing agent, for instance, sodium sulphite, sodium bisulphite or sodium sulphide has been added. Preferably, common salt may be added to the reducing solution so as to prevent bleeding of vat dye on the fabric being dyed.

The aforesaid process according to the invention may be carried out in the jigger in the case of batch dyeing or in the feeder tank of a continuous dyeing plant.

Figure 2:
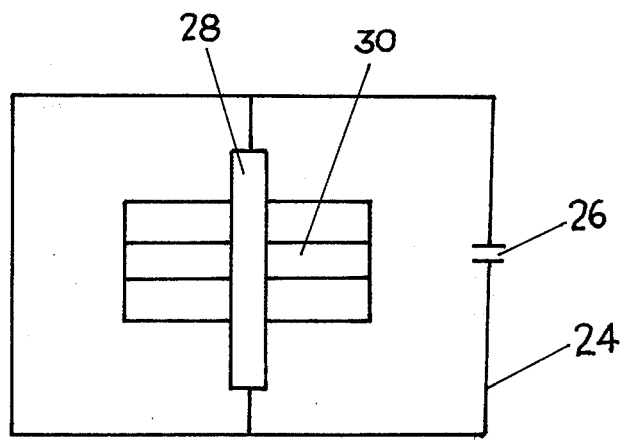

Embodiments of the invention will now be described, by way of example, with reference to the accompanying drawings wherein;

FIG. 1 is a schematic partial side elevation of the feeder tank in a continuous dyeing plant provided with a positive electrode and a negative electrode according to an embodiment of the invention, FIG. 2 is a plan view of the positive electrode, FIG. 3 shows a schematic arrangement and a partial side elevation of a vat dye bath of a jigger used in batch dyeing according to an embodiment of the invention, and FIG. 4 shows a side elevation of the wooden cage associated with the negative electrode shown in FIG. 3.

FIG. 1 shows a feeder tank 2 of a continuous dyeing plant. It is connected by a pipe 4 to a developing trough (not shown) wherein vat dyes are reduced and fixed onto textile materials continually passing therethrough by a reducing solution fed from the feeder tank 2 through the pipe 4. The developing trough is of conventional type and operates in known manner.

As shown, the feeder tank 2 is provided with a negative electrode 6 and a positive electrode 8. Both the electrodes are immersed in an aqueous alkaline reducing solution comprising hydrosulphite, caustic soda, common salt and water. The level of the reducing solution is marked 10.

The negative electrode 6 consists of a wooden cage formed of hoops 12 fixed over ribs 14; a stainless steel wire mesh 16 is mounted on the side and base thereof and is connected to the negative terminal of a d-c power source 18 (FIG. 1) by a stainless steel wire strip 20 which is supported by an insulating support 22. The large size and construction as aforesaid of the negative electrode enables it to generate hydrogen during electrolysis over a large volume of the reducing solution without obstructing the movement of said hydrogen.

The positive electrode 8 on other hand is small in size and comprises a stainless steel strip 23 housed inside a casing 24 in order to minimise the spreading of oxygen in the solution.

As shown, the casing 24 is provided with windows 26 which provide continuity between the reducing solution within and without said casing. To prevent oxygen from spreading, one or more of the windows can be plugged and/or, as shown, the casing so disposed in the reducing solution that the windows face the wall of the feeder tank 2. The steel strip 23 extends inside the casing 24 through a gap 26 in the latter as shown in FIG. 2. and its lower end is prevented from coming in contact with the base of the feeder tank 2 by a wooden cross bar 30.

The upper end of the steel strip 23 is wound around a pulley 32 located between two plates 34 (only one is shown in FIG. 1). The corroded lower end of the steel strip 23 can be replaced by a fresh length of steel strip by turning the pulley 32.

The positive electrode is connected to the positive terminal of the d-c source 18 and reference letters V and A indicate respectively a voltmeter and an ammeter in the electrical circuit.

During operation, an aqueous alkaline reducing solution is prepared from caustic soda, hydrosulphite and common salt in known manner in the feeder tank 2. Before feeding the reducing solution into the developing trough through the feed pipe 4 (FIG. 1), electrolysis is effected in the feeder tank 2 which causes generation of hydrogen which serves to offset the diminution in the reducing effect of the reducing solution because of atmospheric oxygen and oxygen dissolved in the reducing solution.

An advantage of effecting electrolysis as aforesaid is that the reducing solution is not disturbed by atmospheric oxygen or oxygen dissolved in the solution and consequently considerable economy is achieved in the amount of hydrosulphite (reducing agent) required to be used as is evident from the following examples.

EXAMPLE I

According to a known method, 1000 liters of reducing solution was prepared in the feeder tank. The composition of the reducing solution was as follows:

| | |
|---|---|
| Caustic Soda | 55 kg. |
| Hydrosulphite | 45 kg. |
| Common Salt | 5 kg. |

The fabric to be dyed was mineral khakhi (subsequently to be topped with olive green). This fabric was pigment padded before passing through the developing trough. As the fabric passed through said trough, the vat dyes were reduced and fixed on the fabric and further treatment involving oxidation, washing etc. was carried out in the usual manner.

EXAMPLE II

Under the process according to the present invention, 1000 liters of the reducing solution was prepared in the feeder tank, the composition of the solution being as follows:

| | |
|---|---|
| Caustic Soda | 55 kg. |
| Hydrosulphite | 27 kg. |
| Common Salt | 5 kg. |

After stirring the solution, electrolysis was carried out. The current was maintained at about 12.5 amps at 8.5 volts. The electrolysis was continued for about 2½ hours involving consumption of 265 watt hours of electrical energy.

The reducing solution was fed to the developing trough and the fabric treatment carried out as given in Example 1. It was found that economy in operations was obtained on account of the low requirement of hydrosulphite.

Similar economy was obtained by carrying out the process according to the invention in the jigger in the case of batch dyeing. Referring to FIG. 3, the vat dye bath, generally denoted by reference numeral 36, of a jigger 38 provided with guide rollers 40 and 42 which are made of insulating material such as ebonite and which serves to guide a roll of cloth through the dye bath. The dye bath 36 is provided with a positive electrode 8 and a negative electrode 6 disposed, respectively at the surface of and submerged in the vat dye liquor marked 44. The positive electrode 8 comprises a steel wire mesh 8a fitted to a horizontally disposed wooden support strip 8b and suspended by means of two upright wooden strips 8c from a cross plank 46 supported by means of brackets 48 from a cradle shaft 50 or a similar arrangement. The upright wooden support members or strips 10 are each provided with a steel strip 8d which runs under the wire mesh 8a and extends along the length of said upright wooden support strips 8c. The steel strips 8d, apart from acting as an additional support, acts as a conductor for connecting the wire mesh 8a to a direct voltage supply 18.

The negative electrode 6 consists of a stainless steel wire mesh 16 mounted on a wooden cage 17 which wooden cage is provided with four wooden support members 6a, 6b (only two of which are shown in FIGS. 3 and 4). These wooden support members 6a, 6b are also provided with a steel strip (not shown) which runs under the cage 17 and along the length of wooden support members and acts as an additional support and also as a conductor for connecting the wire mesh 16 to the direct voltage supply 18. In said FIG. 3, reference letters V and A denote respectively a voltmeter and an ammeter associated with the direct voltage supply 18.

It should be understood that one or more such units may be used at a time with their negative electrodes and positive electrodes connected in parallel. There are two current methods of using the jigger for dyeing with vat colors. In one method the cloth is previously padded on a padding mangle (not shown) and a roll of the padded cloth is taken and developed in the jigger. The dye bath in this case consists of only alkaline medium such as caustic soda and hydrosulphite, It should be understood that the present invention is applicable to both the above methods.

For reducing the vat dyes, the positive electrode is lowered to lie at the surface of the vat dye liquor 44 and the negative electrode 6 is totally submerged in said liquor. The roll of the cloth is guided by means of guide rollers 40 and 42 through the vat dye liquor 44. When a current is passed between the electrodes 6 and 8 from a direct voltage supply 18, electrolysis occurs in the vat dye liquor and hydrogen is generated therein. This hydrogen being a reducing agent reduces part of the vat dye bath into the leuco form and the balance is reduced by the addition of the chemical reducing agent such as a sodium hydrosulphite. The further steps in the process of dyeing cloth by the vat dyes in the leuco form is completed in known mannner.

By changing the magnitude of the current applied, the generation of hydrogen is controlled and the dye bath maintained in the reduced stage at the desired temperature for different durations. The movement of the roll of cloth in the dye bath is effected in known manner.

In a particular case, the process for reducing vat dyes was carried out as set out in the Example III given below.

EXAMPLE III

A dye bath of about 45 gallons in volume was prepared and about 1.5 kg caustic soda was added thereto in the usual manner. The current was then switched on and maintained at 15 amps. Thereafter, 30% of the normal amount of sodium hydrosulphite required to be used in a conventional reducing process was added in the vat dye liquor and the jigger started in known manner. The current was found to rise suddenly (because of the large number of ions made available by the addition of sodium hydrosulphite) and was controlled and maintained at about 20 amsp.

As the roll of dye cloth, previously mounted in the jigger and guided over the rollers 40 and 42 passed through the vat dye liquor in the dyebath, the level of vat dye liquor 44 was found to drop and this fall in level was restored by addition of water and the reduced condition of the vat dye liquor was checked by means of a vat paper and additional 10% of sodium hydrosulphite was added after the second and the fourth passage of the cloth through the vat dye liquor in the dye bath.

The correct consumption was about 0.6 to 0.7 KWH and a saving of 30% to 35% of sodium hydrosulphite occured.

EXAMPLE IV

According to the present invention, 1000 liters of reducing solution was paprepared in the feeder tank, the composition of the solution being as follows:

| | |
|---|---|
| Caustic Soda | 55 kg. |
| Hydrosulphite | 19 kg. |
| Sodium bisulphite | 8 kg. |

After stirring the solution, electrolysis was carried out. The current was maintained at 20 amps and 20 volts. Electrolysis was continued for 2½ hours. The reducing solution was fed to the developing trough and fabric treatment carried out as given in Example 1. By use of this combination, reduction in consumption of sodium hydrosulphite of the order of 50–55% occured.

EXAMPLE V

A dyebath of about 60 gallons in volume was prepared and about 2.8 kg. caustic soda was added thereto in the usual manner. The current was then switched on and maintained at 20 amps and 7 volts. Thereafter, 1.3 kg. sodium hydrosulphite and 0.3 kg. sodium bisulphite or sodium sulphide (iron free flakes) were added to the liquor and jigger started in known manner. Dyeing was subseqeuently carried out as given in Example III. By use of this combination, reduction in consumption of sodium hydrosulphite of the order of 45-50% should be effected.

EXAMPLE VI

A dye bath of about 60 gallons in volume was prepared at 30°C and about 2.5 kg. caustic soda was added to the bath in the usual manner. Current was then switched on and maintained at 20 amps and 7 volts. Thereafter, 2.0 kg. sodium hydrusulphite and 0.4 kg. sodium bisulphite was added to the bath. Temperature was raised to 50°C and prereduced dye solution was then added to the bath. Subsequent dyeing was carried out as given in Example III.

The aforesaid process according to the invention offers the following advantages:
 i. allows less sodium hydrosulphite to be used without loss in the quality of the finished products.
 ii. renders the process economical by using less sodium hydrosulphite
 iii. obviates stream pollution to a certain extent since the process involves only electrolysis which results in the formation of non-toxic gases, hydrogen and oxygen.

The aforesaid embodiments have been described by way of example only and should not be construed as a limitation of the scope of the invention.

We claim:

1. A process for compensating for reduction in the reducing effect caused by atmospheric oxygen or dissolved oxygen in an aqueous reducing solution of sodium hydrosulphite employed in the vat dye reduction process wherein vat dye is reduced and fixed on textile materials by the reducing action of the aqueous alkaline reducing solution, which process comprises continuously or intermittently forming sulphoxylic acid as a powerful reducing species with relatively high redox potential in said aqueous reducing solution to maintain the reducing strength of said solution, by continuously or intermittently carrying out electrolysis directly through said solution employing a relatively large negative electrode submerged in said solution and a relatively small positive electrode submerged or on the surface of said solution, said negative and positive electrodes being operatively connected to a direct current source.

2. A process as claimed in claim 1, wherein said aqueous alkaline reducing solution contains sodium hydrosulphite in admixture with sodium bisulphite, sodium sulphite, sodium sulphide or dextrin.

3. A process as claimed in claim 2, wherein said electrolysis is effected in the aqueous alkaline reducing solution stored in a feeder tank of a continuous dyeing plant, said reducing solution being fed thereafter to a developing trough of said dyeing plant for reducing and fixing vat dyes on textile material continually passing through said developing trough.

4. A process as claimed in claim 2, wherein said electrolysis is effected in a jigger in the case of batch dyeing.

5. A process as claimed in claim 1, wherein said electrolysis is effected in the aqueous alkaline reducing solution stored in a feeder tank of a continuous dyeing plant, said reducing solution being fed thereafter to a developing trough of said dyeing plant for reducing and fixing vat dyes on textile material continually passing through said developing trough.

6. A process as claimed in claim 1, wherein said electrolysis is effected in a jigger in the case of batch dyeing.

* * * * *